United States Patent
Isozaki et al.

(10) Patent No.: US 8,143,330 B2
(45) Date of Patent: *Mar. 27, 2012

(54) POLYCARBONATE RESIN COMPOSITION, MOLDED POLYCARBONATE RESIN ARTICLE, AND METHOD FOR PRODUCTION OF THE MOLDED POLYCARBONATE RESIN ARTICLE

(75) Inventors: Toshio Isozaki, Ichihara (JP); Kouji Satou, Ichihara (JP); Takayoshi Tanaka, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/747,704

(22) PCT Filed: Dec. 4, 2008

(86) PCT No.: PCT/JP2008/072063
§ 371 (c)(1),
(2), (4) Date: Jun. 11, 2010

(87) PCT Pub. No.: WO2009/075221
PCT Pub. Date: Jun. 18, 2009

(65) Prior Publication Data
US 2010/0267880 A1 Oct. 21, 2010

(30) Foreign Application Priority Data
Dec. 11, 2007 (JP) .................. 2007-319803

(51) Int. Cl.
*C08K 9/02* (2006.01)
(52) U.S. Cl. ........ 523/217; 523/209; 523/210; 524/420; 524/430; 524/439; 524/441; 524/449
(58) Field of Classification Search .............. 524/420, 524/430, 439, 441, 449; 523/210, 217, 209
See application file for complete search history.

(56) References Cited

U.S. PATENT DOCUMENTS

| | | |
|---|---|---|
| 2006/0020075 A1 | 1/2006 | Basham et al. |
| 2007/0112123 A1 | 5/2007 | Sekine |
| 2010/0028640 A1 | 2/2010 | Isozaki et al. |

FOREIGN PATENT DOCUMENTS

| | | |
|---|---|---|
| JP | 05 155638 | 6/1993 |
| JP | 06 099594 | 4/1994 |
| JP | 06 212068 | 8/1994 |
| JP | 07 053768 | 2/1995 |
| JP | 07 118514 | 5/1995 |
| JP | 09 165506 | 6/1997 |
| JP | 2001 262003 | 9/2001 |
| JP | 2002 521547 | 7/2002 |
| JP | 2006 022236 | 1/2006 |
| JP | 2006 169324 | 6/2006 |
| JP | 2006 249291 | 9/2006 |
| JP | 2007 153729 | 6/2007 |
| WO | 2006 012466 | 2/2006 |
| WO | 2008 047672 | 4/2008 |
| WO | 2008 047673 | 4/2008 |

OTHER PUBLICATIONS

U.S. Appl. No. 12/747,688, filed Jun. 11, 2010, Isozaki, et al.
U.S. Appl. No. 12/745,170, filed May 27, 2010, Isozaki, et al.
U.S. Appl. No. 12/742,310, filed May 11, 2010, Isozaki, et al.
U.S. Appl. No. 12/739,548, filed Jun. 23, 2010, Isozaki, et al.
U.S. Appl. No. 12/739,448, filed Jul. 2, 2010, Isozaki, et al.
U.S. Appl. No. 12/445,739, filed Apr. 16, 2009, Isozaki, et al.
U.S. Appl. No. 12/445,688, filed Apr. 15, 2009, Isozaki, et al.

*Primary Examiner* — Peter Szekely
(74) *Attorney, Agent, or Firm* — Oblon, Spivak, McClelland, Maier & Neustadt, L.L.P.

(57) ABSTRACT

Provided is a polycarbonate resin composition which contains specific amounts of a glass filler and glossy particles, which can be molded into an article in which no difference in lightness is visually observed between the left side and the right side of the weld line, and which has excellent optical properties and flame retardancy. The polycarbonate resin composition contains: a composition formed of an aromatic polycarbonate resin (A) and a glass filler (B) having a difference in refractive index 0.002 or less from the aromatic polycarbonate resin of; glossy particles (C-1) having an average particle diameter of 10 μm or more and less than 50 μm; glossy particles (C-2) having an average particle diameter of 50 to 300 μm; a silicone compound (D) having a reactive functional group; and an organic alkali metal salt compound and/or an organic alkali earth metal salt compound (E). Also provided are a polycarbonate resin molded article produced by molding the resin composition, and a method of producing a polycarbonate resin molded article, which is characterized by involving subjecting the resin composition to an injection molding at a mold temperature of 120° C. or higher.

13 Claims, No Drawings

POLYCARBONATE RESIN COMPOSITION, MOLDED POLYCARBONATE RESIN ARTICLE, AND METHOD FOR PRODUCTION OF THE MOLDED POLYCARBONATE RESIN ARTICLE

TECHNICAL FIELD

The present invention relates to a polycarbonate resin composition, a polycarbonate resin molded article using the composition, and a method of producing the molded article, and more specifically, to a polycarbonate resin composition containing a glass filler, which is excellent in galactic appearance (glittering pattern like the night sky studded with stars), metallic appearance, and provided with high flame retardancy, a polycarbonate resin molded article obtained by molding the resin composition, and a method of producing the molded article.

BACKGROUND ART

Polycarbonate resin molded articles have been widely used as, for example, industrial transparent materials in the fields of electrical and electronic engineering, mechanical engineering, automobiles, and the like or optical materials for lenses, optical disks, and the like because each of the articles is excellent in transparency and mechanical properties. When an additionally high mechanical properties is needed, a glass filler or the like is added to each of the articles to reinforce the article.

Glass fibers each constituted of glass generally called an E glass have been used as the glass filler. However, the refractive index of the E glass at a sodium D-line (nD, hereinafter simply referred to as "refractive index") is somewhat small, specifically, about 1.555, though the refractive index of a polycarbonate resin is 1.580 to 1.590. Accordingly, when the glass filler is added to a polycarbonate resin composition in an amount needed for an increase in mechanical properties of the composition, the following problem arises: the resultant E glass-reinforced polycarbonate resin composition cannot maintain its transparency owing to a difference in refractive index between the filler and the polycarbonate resin of which the composition is formed, with the result that when the resin to which glossy particles are added in order that a metallic appearance or galactic appearance may be obtained is not the transparent resin, only the glossy particles near the surface of a molded article are seen, so neither a metallic appearance nor a galactic appearance can be obtained.

To solve such problem, investigation has been conducted on, for example, a reduction in refractive index of a polycarbonate resin by the improvement of the resin or an increase in refractive index of a glass filler by the improvement of the composition of the glass filler.

For example, (1) a resin composition containing a polycarbonate resin composition using a product of a reaction between a hydroxyaralkyl alcohol and a lactone as a terminating agent and a glass filler having a difference in refractive index of 0.01 or less from the polycarbonate resin composition (see Patent Document 1), (2) a resin composition formed of a polycarbonate resin, a glass filler having a difference in refractive index of 0.015 or less from the polycarbonate resin, and polycaprolactone (see Patent Document 2), and (3) a glass composition obtained by incorporating, for example, $ZrO_2$, $TiO_2$, BaO, and ZnO into a glass filler composition at a specific ratio so that the refractive index of the composition is close to that of a polycarbonate resin (see Patent Document 3) have been proposed.

However, the resin composition in Patent Document 1 is not practical because of the following reasons: when the glass filler is added in an amount needed for improvement in dimensional stability and mechanical properties of the composition, the difference in refractive index at such level is not small enough for the addition to exert its effect, and the glass filler is too expensive to be used as a raw material for the production of the polycarbonate resin composition.

The polycarbonate resin composition in Patent Document 2 involves the following problem: reductions in heat resistance and mechanical properties of the composition are inevitable owing to the presence of polycaprolactone which has a low softening temperature and is added to decrease the refractive index, though the composition can maintain its transparency even when the glass filler has a difference in refractive index of 0.015 or less from the polycarbonate resin.

Unless the content of each of, for example, $ZrO_2$, $TiO_2$, BaO, and ZnO in the glass composition in Patent Document 3 is appropriately adjusted, the glass filler itself will devitrify. As a result, even when the glass filler composition has a refractive index almost equal to that of the polycarbonate resin, a polycarbonate resin composition containing the glass filler composition may be unable to obtain transparency. In addition, the significance of the use of a glass filler-reinforced polycarbonate resin composition for the purpose of a weight reduction wanes because the specific gravity of the glass filler itself increases. In addition, none of Patent Documents 1 to 3 make any mention of the problem of the decrease of the weld line and the decrease in orientation of the glossy particles.

Further, in the case of a polycarbonate resin composition containing glossy particles, when the resin composition is molded, a weld line is formed at a part where molten resin compositions are merged into and welded to each other, and as a result, the difference in lightness between the left and right sides of the weld line is caused.

As a result of this phenomenon, light reflection by the glossy particles is scattered, and accordingly, the vicinity of the weld line becomes dark. Accordingly, there lowers a commercial value of a resin molded article, and hence there have been proposed various conutermeasures to prevent the phenomenon.

For example, as the glossy particles, there have been proposed: (4) a resin composition containing particles having a shape in which an average particle diameter is 10 to 300 μm and an aspect ratio is ⅛ to 1 (see Patent Document 4); and (5) a resin composition containing fine metal particles which is in a square shape with a notch at one corner (see Patent Document 5). In those glossy particles, it has been suggested that the shapes of the glossy particles themselves can prevent formation of the weld line and have an effect of decreasing the orientation of the glossy particles.

However, in Patent Documents 4 and 5, there is no description about the case of adding a glass filler to the resin composition, and, as might be expected, there is no description that the orientation of the glossy particles can be decreased by the glass filler. In addition, there is no description on flame retardancy of the resin composition, and the fields in which the resin composition can be used are limited when flame retardancy is not imparted thereto.

It should be noted that (6) a glass-filler-reinforced polycarbonate resin composition having a metallic appearance (see Patent Document 6) has been also proposed, but in this case, there is no description on an issue of decreasing the orientation of the glossy particles on the weld line. In addition, there is no description on flame retardancy of the glass-filler-reinforced polycarbonate resin composition, and the fields in which the glass-filler-reinforced polycarbonate resin composition can be used are limited when the flame retardancy is not imparted thereto.

Further, there has been disclosed (7) a molded product in which amorphous polymer particles are attached to flaky fine particles by performing precipitation polymerization of a polycarbonate-based resin and the like in the presence of glossy flaky fine particles in order not to cause appearances defects such as a weld line and a weld dichroism (see Patent Document 7).

Still further, there has been proposed (8) a polycarbonate resin composition, in which a refractive index is improved by adding thereto a polycarbonate resin and a specific glass to which oxides of various metals are added, and which has a difference in refractive index of 0.001 or less from the polycarbonate resin composition (see Patent Document 8).

However, in the case of Patent Document 7, it is only AAS resin that is specifically described as the amorphous polymer in examples and comparative examples, and there is no description about the polycarbonate resin. In addition, there is no description about the case of adding a glass filler to the polycarbonate resin, and, as might be expected, there is no description that the orientation of the glossy particles can be decreased by the glass filler. There is also no description on flame retardancy of the polycarbonate resin, and the fields in which the polycarbonate resin can be used are limited when flame retardancy is not imparted thereto. In the polycarbonate resin composition of Patent Document 8, there is no description on an issue of decreasing the orientation of the glossy particles on the weld line, and in addition, there is no reference to flame retardancy of the polycarbonate resin composition, and the fields in which the polycarbonate resin composition can be used are limited when flame retardancy is not imparted thereto.

Patent Document 1: JP07-118514-A
Patent Document 2: JP09-165506-A
Patent Document 3: JP05-155638-A
Patent Document 4: JP06-99594-A
Patent Document 5: JP07-53768-A
Patent Document 6: JP06-212068-A
Patent Document 7: JP2001-262003-A
Patent Document 8: JP2006-022236-A

DISCLOSURE OF THE INVENTION

Problems to be Solved by the Invention

The present invention has, under the above-mentioned circumstances, an object to provide: a polycarbonate resin composition in which, by allowing the polycarbonate resin composition to contain a specific amount of a limited glass filler, the difference in lightness between the left and right sides of a weld line is not visually observed, a good metallic appearance or a galactic appearance is obtained, mechanical properties and physical properties are excellent, and high flame retardancy is provided; a polycarbonate resin molded article formed by molding the resin composition; and a method of producing the polycarbonate resin molded article.

Means for solving the Problems

The inventors of the present invention have made extensive studies with a view to achieving the object. As a result, the inventors have found that the object can be achieved with the following polycarbonate resin composition having excellent flame retardancy and a polycarbonate resin molded article produced by molding the resin composition. That is, the resin composition contains an aromatic polycarbonate resin and two kinds of glossy particles having different particle diameter ranges, the loading of a glass filler having a difference in refractive index of 0.002 or less from the resin of is set to a specific amount with respect to the resin, and furthermore, the resin composition contains each of a silicone compound having a reactive functional group, and an organic alkali metal salt compound and/or an organic alkali earth metal salt compound at a predetermined ratio. The present invention has been completed based on such finding.

That is, the present invention provides: (1) a polycarbonate resin composition, including: a composition formed of 60 to 90 parts by mass of an aromatic polycarbonate resin (A) and 40 to 10 parts by mass of a glass filler (B) having a difference in refractive index of 0.002 or less from the aromatic polycarbonate resin; 0.005 to 3.0 parts by mass of glossy particles (C-1) having an average particle diameter of 10 μm or more and less than 50 μm with respect to 100 parts by mass of the composition; 0.005 to 2.0 parts by mass of glossy particles (C-2) having an average particle diameter of 50 to 300 μm with respect to 100 parts by mass of the composition; 0.01 to 3.0 parts by mass of a silicone compound (D) having a reactive functional group with respect to 100 parts by mass of the composition; and 0.03 to 1.0 part by mass of an organic alkali metal salt compound and/or an organic alkali earth metal salt compound (E) with respect to 100 parts by mass of the composition;
(2) the polycarbonate resin composition according to the item (1), in which the glass filler as the component (B) includes a glass fiber;
(3) the polycarbonate resin composition according to the item (1), in which the refractive index of the glass filler as the component (B) is 1.583 to 1.587;
(4) the polycarbonate resin composition according to the item (1), in which the glossy particles as the component (C) include one kind or two or more kinds selected from the group consisting of mica, metal particles, metal sulfide particles, particles each having a surface coated with a metal or a metal oxide, and glass flakes each having a surface coated with a metal or a metal oxide;
(5) the polycarbonate resin composition according to the item (1), further including 0.0001 to 1 part by mass of a colorant (F) with respect to 100 parts by mass of the composition formed of the component (A) and the component (B);
(6) a polycarbonate resin molded article obtained by molding the polycarbonate resin composition according to the item (1);
(7) the polycarbonate resin molded article according to the item (6), in which the polycarbonate resin molded article is obtained by injection molding at a mold temperature of 120° C. or higher;
(8) the polycarbonate resin molded article according to the item (6), in which the polycarbonate resin molded article has a flame retardancy, which is determined by a flame retardancy evaluation method in conformity with UL94, of 1.5 mmV-0; and
(9) a method of producing a polycarbonate resin molded article, including subjecting the polycarbonate resin composition according to the item (1) to an injection molding at a mold temperature of 120° C. or higher.

Effects by the Invention

According to the present invention, there are provided the polycarbonate resin composition which is excellent in transparency, strength, and heat resistance, and provided with high flame retardancy, and the polycarbonate resin molded article having an excellent galactic appearance or metallic appearance. Further, there is provided the method of producing a polycarbonate resin molded article having an excellent galactic appearance or metallic appearance.

BEST MODE FOR CARRYING OUT THE INVENTION

A polycarbonate resin (which may hereinafter be abbreviated as "PC resin") composition of the present invention contains an aromatic polycarbonate resin (A), a glass filler (B) having a difference in refractive index of 0.002 or less from the aromatic polycarbonate resin, glossy particles (C-1) having an average particle diameter of 10 μm or more and less than 50 μm, glossy particles (C-2) having an average particle diameter of 50 to 300 μm, a silicone compound (D) having a reactive functional group, and an organic alkali metal salt compound and/or an organic alkali earth metal salt compound (E) as essential components.

In the PC resin composition of the present invention, an aromatic PC resin produced by a reaction between a dihydric phenol and a carbonate precursor can be specifically used as the aromatic PC resin as the component (A).

A method of producing the aromatic PC resin as the component (A) is not particularly limited, and resins produced by various conventional methods can each be used as the resin. For example, a resin produced from a dihydric phenol and a carbonate precursor by a solution method (interfacial polycondensation method) or a melt method (ester exchange method), that is, a resin produced by, for example, an interfacial polycondensation method involving causing the dihydric phenol and phosgene to react with each other in the presence of a terminating agent or an ester exchange method involving causing the dihydric phenol and diphenyl carbonate or the like to react with each other in the presence of a terminating agent can be used.

As the dihydric phenol, various examples are given. In particular, examples thereof include 2,2-bis(4-hydroxyphenyl)propane[bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, and bis(4-hydroxyphenyl)ketone. In addition, hydroquinone, resorcin, and catechol can be also exemplified. One kind of those dihydric phenols may be used alone, or two or more kinds thereof may be used in combination. Of those, bis(hydroxyphenyl)alkanes are preferred, and bisphenol A is particularly preferred.

On the other hand, as the carbonate precursor, a carbonyl halide, a carbonyl ester, or a haloformate, and the like are given. Specifically, phosgene, a dihaloformate of a dihydric phenol, diphenyl carbonate, dimethyl carbonate, and diethyl carbonate are given.

It should be noted that the aromatic PC resin may have a branched structure. As a branching agent, 1,1,1-tris(4-hydroxyphenyl)ethane, α,α',α"-tris(4-hydroxyphenyl)-1,3,5-triisopropylbenzene, fuluoroglycine, trimellitic acid, and isatin bis(o-cresol) are exemplified.

In the present invention, a viscosity-average molecular weight (Mv) of the aromatic PC resin used as component (A) is generally 10,000 to 50,000, preferably 13,000 to 35,000, or more preferably 15,000 to 20,000.

The viscosity-average molecular weight (Mv) is calculated by the following equation, after a limiting viscosity [η] is obtained by determining a viscosity of a methylene chloride solution at 20° C. by using a Ubbelohde type viscometer.

$$[\eta]=1.23\times10^{-5} Mv^{0.83}$$

A molecular terminal group in the aromatic PC resin as the component (A) is not particularly limited, and a monovalent, phenol-derived group as a conventionally known terminating agent may be used; a monovalent, phenol-derived group having an alkyl group having 10 to 35 carbon atoms is preferred. When the molecular terminal is a phenol-derived group having an alkyl group of 10 or more carbon atoms, a PC resin composition to be obtained has good flowability. In addition, when the molecular terminal is a phenol-derived group having an alkyl group having 35 or less carbon atoms, the PC resin composition to be obtained has good heat resistance and good impact resistance.

Examples of the monovalent phenol having an alkyl group of 10 to 35 carbon atoms include decyl phenol, undecyl phenol, dodecyl phenol, tridecyl phenol, tetradecyl phenol, pentadecyl phenol, hexadecyl phenol, heptadecyl phenol, octadecyl phenol, nonadecyl phenol, icosyl phenol, docosyl phenol, tetracosyl phenol, hexacosyl phenol, octacosyl phenol, triacontyl phenol, dotriacontyl phenol, and pentatriacontyl phenol.

The alkyl group may be present at any one of the o-, m-, and p-positions of each of those alkyl phenols with respect to the hydroxy group; the alkyl group is preferably present at the p-position. In addition, the alkyl group may be a linear group, a branched group, or a mixture of them.

At least one substituent of each of the alkyl phenols has only to be the alkyl group of 10 to 35 carbon atoms, and the other four substituents are not particularly limited; each of the other four substituents may be an alkyl group of 1 to 9 carbon atoms, an aryl group of 6 to 20 carbon atoms, or a halogen atom, or each of the alkyl phenols may be unsubstituted except for the hydroxy group and the alkyl group of 10 to 35 carbon atoms.

Only one of the terminals of the PC resin may be capped with a monovalent phenol having the alkyl group of 10 to 35 carbon atoms, or each of both the terminals may be capped with the phenol. In addition, terminals each denatured with the phenol account for preferably 20% or more, or more preferably 50% or more of all terminals from the viewpoint of an improvement in flowability of the PC resin composition to be obtained. That is, the other terminals none of which is capped with the phenol may each be capped with a hydroxy group terminal or any one of the other terminating agents in the following description.

Herein, examples of the other terminating agents include phenol, p-cresol, p-tert-butylphenol, p-tert-octylphenol, p-cumylphenol, p-nonylphenol, p-tert-amylphenol, bromophenol, tribromophenol, and pentabromophenol, which are commonly used in the production of the aromatic PC resin. Of those, a halogen-free compound is preferred in view of environmental issues.

In the PC resin composition of the present invention, the aromatic PC resin as the component (A) can appropriately contain, in addition to the PC resin, a copolymer resin such as a polyester-polycarbonate resin obtained by polymerizing polycarbonate in the presence of an ester precursor such as a bifunctional carboxylic acid such as terephthalic acid or an ester-forming derivative of the acid, or any other polycarbonate resin to such an extent that the object of the present invention is not impaired.

In the PC resin composition of the present invention, it is required that the glass filler used as the component (B) has a difference in refractive index of 0.002 or less from the aromatic PC resin as the component (A), and that, with respect to 100 parts by mass of a composition formed of the PC resin and the glass filler, the content of the aromatic PC resin be 60 to 90 parts by mass and the content of the glass filler be 40 to 10 parts by mass. When the difference in refractive index between the glass filler and the aromatic PC resin is more than 0.002, the transparency of the molded article obtained by using the PC resin composition becomes insufficient. The difference in refractive index is preferably 0.001 or less, and in particular, it is preferred that the refractive index of the glass filler be the same as that of the aromatic PC resin used as the component (A). As such glass filler, it is preferred to use a glass filler having a refractive index of 1.583 to 1.587.

In the PC resin composition of the present invention, the contents of the aromatic polycarbonate resin as the component (A) and the glass filler as the component (B) must be as described below. That is, the content of the component (A) must be 60 to 90 parts by mass and the content of the component (B) must be 40 to 10 parts by mass based on 100 parts by mass of the total amount of the components. When the content of the component (B) is less than 10 parts by mass, an improving effect on rigidity is not sufficiently exerted. In addition, when the content exceeds 40 parts by mass, a specific gravity increases and the impact resistance reduces. From the viewpoints of, for example, the rigidity, the impact resistance, and the specific gravity, the content of the component (A) is preferably 70 to 90 parts by mass, and the content of the component (B) is preferably 30 to 10 parts by mass.

Glass of which such glass filler is constituted is, for example, a "Glass I" or "Glass II" having the following composition.

It is preferred that the "Glass I" contain 50 to 60% by mass of silicon oxide ($SiO_2$), 10 to 15% by mass of aluminum oxide ($Al_2O_3$), 15 to 25% by mass of calcium oxide (CaO), 2 to 10% by mass of titanium oxide ($TiO_2$), 2 to 8% by mass of boron oxide ($B_2O_3$), 0 to 5% by mass of magnesium oxide (MgO), 0 to 5% by mass of zinc oxide (ZnO), 0 to 5% by mass of barium oxide (BaO), 0 to 5% by mass of zirconium oxide ($ZrO_2$), 0 to 2% by mass of lithium oxide ($Li_2O$), 0 to 2% by mass of sodium oxide ($Na_2O$), and 0 to 2% by mass of potassium oxide ($K_2O$), and have a total content of the lithium oxide ($Li_2O$), the sodium oxide ($Na_2O$), and the potassium oxide ($K_2O$) of 0 to 2% by mass.

On the other hand, it is preferred that the "Glass II" contain 50 to 60% by mass of silicon oxide ($SiO_2$), 10 to 15% by mass of aluminum oxide ($Al_2O_3$), 15 to 25% by mass of calcium oxide (CaO), 2 to 5% by mass of titanium oxide ($TiO_2$), 0 to 5% by mass of magnesium oxide (MgO), 0 to 5% by mass of zinc oxide (ZnO), 0 to 5% by mass of barium oxide (BaO), 2 to 5% by mass of zirconium oxide ($ZrO_2$), 0 to 2% by mass of lithium oxide ($Li_2O$), 0 to 2% by mass of sodium oxide ($Na_2O$), and 0 to 2% by mass of potassium oxide ($K_2O$), be substantially free of boron oxide ($B_2O_3$), and have a total content of the lithium oxide ($Li_2O$), the sodium oxide ($Na_2O$), and the potassium oxide ($K_2O$) of 0 to 2% by mass.

The content of $SiO_2$ in each of the "Glasses I and II" is preferably 50 to 60% by mass from the viewpoints of the strength of the glass filler and solubility at the time of the production of each of the glasses. The content of $Al_2O_3$ is preferably 10 to 15% by mass from the viewpoints of the chemical durability of each of the glasses such as water resistance and solubility at the time of the production of each of the glasses. The content of CaO is preferably 15 to 25% by mass from the viewpoints of solubility at the time of the production of each of the glasses and the suppression of the crystallization of each of the glasses.

The "Glass I" can contain 2 to 8% by mass of $B_2O_3$ like the E glass. In this case, the content of $TiO_2$ is preferably 2 to 10% by mass from the viewpoints of, for example, an improving effect on the refractive index of the glass and the suppression of the devitrification of the glass.

In addition, it is preferred that the "Glass II" be substantially free of $B_2O_3$ like ECR glass composition, which is excellent in acid resistance and alkali resistance. In this case, the content of $TiO_2$ is preferably 2 to 5% by mass from the viewpoint of the adjustment of the refractive index of the glass. In addition, the content of $ZrO_2$ is preferably 2 to 5% by mass from the viewpoints of an increase in refractive index of the glass, an improvement in chemical durability of the glass, and solubility at the time of the production of the glass.

In each of the "Glasses I and II", MgO is an arbitrary component, and can be incorporated at a content of about 0 to 5% by mass from the viewpoints of an improvement in durability of each of the glasses such as a tensile strength and solubility at the time of the production of each of the glasses. In addition, ZnO and BaO are also arbitrary components, and each of them can be incorporated at a content of about 0 to 5% by mass from the viewpoints of an increase in refractive index of each of the glasses and the suppression of the devitrification of each of the glasses.

In the "Glass I", $ZrO_2$ is an arbitrary component, and can be incorporated at a content of about 0 to 5% by mass from the viewpoints of an increase in refractive index of the glass and solubility through the production of the glass.

In each of the "Glasses I and II", $Li_2O$, $Na_2O$, and $K_2O$ as alkali components are arbitrary components, and each of them can be incorporated at a content of about 0 to 2% by mass. In addition, the total content of the alkali components is preferably 0 to 2% by mass. When the total content is 2% by mass or less, a reduction in water resistance of each of the glasses can be suppressed.

As described above, each of the "Glasses I and II" contains a small amount of alkali components, and hence a reduction in molecular weight of the PC resin composition due to the decomposition of the aromatic PC resin as the component (A) can be suppressed, and reductions in physical properties of an article molded out of the PC resin composition can be prevented.

Each of the "Glasses I and II" may contain, in addition to the glass components, for example, an oxide containing an element such as lanthanum (La), yttrium (Y), gadolinium (Gd), bismuth (Bi), antimony (Sb), tantalum (Ta), niobium (Nb), or tungsten (W) as a component for increasing the refractive index of the glass to such an extent that the spinning property, water resistance, and the like of the glass are not adversely affected. In addition, each of the glasses may contain an oxide containing an element such as cobalt (Co), copper (Cu), or neodymium (Nd) as a component for discoloring the yellow color of the glass.

In addition, the content of $Fe_2O_3$ as an impurity on an oxide basis in the glass raw materials to be used in the production of each of the "Glasses I and II" is preferably less than 0.01% by mass with respect to the entirety of the glass in order that the discoloring of the glass may be suppressed.

The glass filler as the component (B) in the PC resin composition of the present invention can be obtained by: appropriately choosing a glass having a difference in refractive index of 0.002 or less from the aromatic PC resin as the component (A) to be used from the "Glasses I and II" each having the above-mentioned glass composition; and forming the chosen glass into a desired shape. A form of the glass filler is not particularly limited, and in order to decrease the difference in lightness between the left and right sides of the weld line to such an extent that the difference in lightness cannot be visually observed, a glass fiber is suitable as the glass filler.

The glass fibers can be obtained by employing a conventionally known spinning method for glass long fibers. For example, glass can be turned into fibers by employing any one of the various methods such as: a direct melt (DM) method involving continuously turning raw materials for glass into glass in a melting furnace, introducing the resultant glass into a forehearth, and attaching a bushing to the bottom of the forehearth to spin the glass; and a remelting method involving processing molten glass into a marble-, cullet-, or rod-like shape, remelting the resultant, and spinning the resultant.

Although the diameter of each of the glass fibers is not particularly limited, fibers each having a diameter of about 3 to 25 μm are preferably used in ordinary cases. When the diameter is 3 μm or more, diffuse reflection is suppressed, whereby a reduction in transparency of the molded article can be prevented. In addition, when the diameter is 25 μm or less, the molded article to be obtained has a good strength.

The average length of the glass fibers is 300 μm or more and preferably 350 μm or more. When the average length of the glass fibers is less than 300 μm, a tendency becomes apparent, that an effect of decreasing the difference in lightness between the left and right sides of the weld line becomes difficult to be obtained. It should be noted that the average length can be measured by incinerating a part of the resin composition, the pellet, or the molded article by an electric furnace in air at 600° C. for 2 hours, and then observing combustion residues by a microscope and the like.

The surface of the glass filler is preferably treated with a coupling agent in order that the glass filler may show an increased affinity for the aromatic PC resin as the component (A), adhesiveness between the glass filler and the resin may be improved, and reductions in transparency and strength of the molded article due to the formation of voids in the glass filler may be suppressed. A silane-based coupling agent, a borane-based coupling agent, an aluminate-based coupling agent, a titanate-based coupling agent, or the like can be used as the coupling agent. The silane-based coupling agent is particularly preferably used because adhesiveness between the aromatic PC resin and the glass filler can be improved.

Specific examples of the silane-based coupling agent include triethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyltris(2-methoxy-ethoxy)silane, N-methyl-γ-aminopropyltrimethoxysilane, N-vinylbenzyl-γ-aminopropyltriethoxysilane, triaminopropyltrimethoxysilane, 3-ureidopropyltrimethoxysilane, 3-(4,5-dihydroimidazolyl)propyltriethoxysilane, hexamethyldisilazane, N,O-(bistrimethylsilyl)amide, and N,N-bis(trimethylsilyl)urea. Of those, preferred are amino silanes and epoxysilanes such as γ-aminopropyltrimethoxysilane, N-β-(aminoethyl)-γ-aminopropyltrimethoxysilane, γ-glycidoxypropyltrimethoxysilane, and β-(3,4-epoxycyclohexyl)ethyltrimethoxysilane.

The surface of the glass filler can be treated with such coupling agent by an ordinary known method without any particular limitation. The surface treatment can be performed by an appropriate method depending on the shape of the glass filler; examples of the method include a sizing treatment method involving applying a solution or suspension of the above coupling agent in an organic solvent as the so-called sizing agent to the glass filler, a dry mixing method involving the use of a Henschel mixer, a super mixer, a Redige mixer, a V-type blender, or the like, a spray method, an integral blend method, and a dry concentrate method. The surface treatment is desirably performed by the sizing treatment method, the dry mixing method, or the spray method.

Subsequently, description is given of the glossy particles as the components (C-1) and (C-2) in the PC resin composition of the present invention.

Examples of the glossy particles include mica, metal particles, metal sulfide particles, particles each having a surface coated with a metal or a metal oxide, and glass flakes each having a surface coated with a metal or a metal oxide.

Specific examples of the metal particles include metal powders each made of, for example, aluminum, gold, silver, copper, nickel, titanium, or stainless steel. Specific examples of the particles each having a surface coated with a metal or a metal oxide include mica-based particles coated with a metal oxide such as a mica titanium coated with titanium oxide and a mica coated with bismuth trichloride. Specific examples of the metal sulfide particles include metal sulfide powders each made of, for example, nickel sulfide, cobalt sulfide, or manganese sulfide. A metal used in each of the glass flakes each having a surface coated with a metal or a metal oxide is, for example, gold, silver, platinum, palladium, nickel, copper, chromium, tin, titanium, or silicon.

The glossy particles as the component (C-1) have an average particle diameter of 10 μm or more and less than 50 μm, and the glossy particles as the component (C-2) have an average particle diameter of 50 μm to 300 μm.

Glossy particles having a small average particle diameter generally have such properties that the particles each have an inconspicuous orientation but each provide poor metallic feeling. In contrast, glossy particles having a large average particle diameter have such properties that the particles each provide excellent metallic feeling but each have a conspicuous orientation. Combined use of the two kinds of glossy particles having different average particle diameter ranges in specific loadings as in the present invention can not only provide metallic feeling but also reduce the orientation of each of the glossy particles themselves.

The average particle diameter of glossy particles can be determined from the result of a particle size distribution measured for a kerosene-based solution containing the glossy particles at a concentration of 0.1% by mass with, for example, a laser diffraction particle size distribution-measuring apparatus (MASTER SIZER 2000 manufactured by Malvern Instruments Ltd.).

The loading of the glossy particles as the above component (C-1) is 0.005 to 3.0 parts by mass, preferably 0.01 to 2.5 parts by mass, or more preferably 0.1 to 2.0 parts by mass with respect to 100 parts by mass of the composition formed of the component (A) and the component (B). The loading of the glossy particles as the component (C-2) is 0.005 to 2.0 parts by mass, preferably 0.01 to 1.5 part by mass, or more preferably 0.1 to 1.2 part by mass with respect to 100 parts by mass of the composition formed of the component (A) and the component (B).

Setting the content of each of the component (C-1) and the component (C-2) to 0.005 part by mass or more forms a galactic appearance or a metallic appearance. Setting the content of the component (C-1) to 3.0 parts by mass or less and the content of the component (C-2) to 2.0 parts by mass or less prevents an increase in amount in which the glossy particles themselves stand on the surface of the molded article, does not impair the appearance, and prevents a reduction in flame retardancy.

The silicone compound having a reactive functional group is further added as the component (D) to the PC resin composition of the present invention for the purpose of, for example, an additional improvement in flame retardancy of the composition.

Examples of the silicone compound having a reactive functional group (which may hereinafter be referred to as "reactive functional group-containing silicone compound") include polyorganosiloxane polymers and/or copolymers each having a basic structure represented by a general formula (1):

$$R^1_a R^2_b SiO_{(4-a-b)/2} \qquad (1)$$

In the general formula (1), $R^1$ represents a reactive functional group. Examples of the reactive functional group include an alkoxy group, an aryloxy group, a polyoxyalkylene group, a hydrogen group, a hydroxy group, a carboxy group, a silanol group, an amino group, a marcapto group, an epoxy group, and a vinyl group. Of those, preferred are the alkoxy group, the hydroxy group, the hydrogen group, the epoxy group, and the vinyl group.

$R^2$ represents a hydrocarbon group of 1 to 12 carbon atoms. Examples of the hydrocarbon group include a linear or branched alkyl group of 1 to 12 carbon atoms, a cycloalkyl group of 5 to 12 carbon atoms, an aryl group of 6 to 12 carbon atoms, and an aralkyl group of 7 to 12 carbon atoms. Specific examples thereof include a methyl group, an ethyl group, an n-propyl group, an isopropyl group, various butyl groups, various pentyl groups, various hexyl groups, various octyl groups, a cyclopentyl group, a cyclohexyl group, a phenyl group, a tolyl group, a xylyl group, a benzyl group, and a phenetyl group.

The "a" and "b" represent numbers satisfying relationships of $0 \leq a \leq 3$, $0 < b \leq 3$, and $0 < a+b \leq 3$. When multiple $R^1$'s are present, the multiple $R^1$'s may be the same or different from one another. When multiple $R^2$'s are present, the multiple $R^2$'s may be the same or different from one another.

In the present invention, polyorganosiloxane polymer and/or copolymer resins each having multiple reactive functional groups of the same kind, and polyorganosiloxane polymers and/or copolymers each having multiple reactive functional groups of different kinds can be used in combination.

The polyorganosiloxane polymers and/or copolymers each having the basic structure represented by the general formula (1) each have a ratio of the number of its reactive functional groups ($R^1$) to the number of its hydrocarbon groups ($R^2$) of typically about 0.1 to 3, or preferably about 0.3 to 2.

Such reactive functional group-containing silicone compound, which is a liquid, powder, or the like, preferably shows good dispersibility in melt-kneading. A liquid compound having a viscosity at room temperature of about 10 to 500,000 mm$^2$/s can be exemplified.

The PC resin composition of the present invention has the following characteristics: even when the reactive functional group-containing silicone compound is a liquid, the compound is uniformly dispersed in the composition, and bleeds through molding or to the surface of the molded article to a small extent.

The reactive functional group-containing silicone compound as the component (D) is incorporated into the PC resin composition of the present invention at a content of 0.01 to 3.0 parts by mass with respect to 100 parts by mass of the composition formed of the component (A) and the component (B).

When the content of the component (D) is less than 0.01 part by mass, a preventing effect on dripping at the time of the combustion of the composition is insufficient. In addition, when the content exceeds 3.0 parts by mass, a screw starts to slide at the time of the kneading of the raw materials for the composition, so the raw materials cannot be successfully fed, and the ability of an apparatus including the screw to produce the composition reduces. The content of the component (D) is preferably 0.1 to 1.5 part by mass, or more preferably 0.5 to 1.0 part by mass from the viewpoints of the prevention of the dripping and productivity. Further, the reactive functional group-containing silicone compound has a refractive index of 1.45 to 1.65 and preferably 1.48 to 1.60 in order to maintain the translucency of the PC resin composition through adding the silicone compound thereto.

The organic alkali metal salt compound and/or the organic alkaline earth metal salt compound as the component (E) are/is added to the PC resin composition of the present invention for the purpose of, for example, further improving flame retardancy of the composition. Various compounds can be given as examples of the organic alkali metal salt compound and/or the organic alkaline earth metal salt compound; an alkali metal salt or alkaline earth metal salt of an organic acid or organic ester having at least one carbon atom is typically used.

Herein, examples of the organic acid and organic acid ester include organic sulfonic acid, organic carboxylic acid, and polystyrene sulfonic acid. On the other hand, examples of the alkali metal include sodium, potassium, lithium, and cesium. Examples of the alkaline earth metal include magnesium, calcium, strontium, and barium. Of those, the salt of sodium, potassium, or cesium is preferably used. In addition, the salt of the organic acid may be substituted by a halogen atom such as fluorine, chlorine, or bromine.

An alkali metal salt compound and alkaline earth metal salt compound of a perfluoroalkanesulfonic acid represented by a general formula (2) is preferably used as an alkali metal salt compound and/or alkaline earth metal salt compound of an organic sulfonic acid out of the various organic alkali metal salt compounds and/or organic alkaline earth metal salt compounds:

$$(C_c F_{2c+1} SO_3)_d M \qquad (2)$$

A compound described in, for example, JP47-40445-B corresponds to such compound. In the general formula (2), "c" represents an integer of 1 to 10, "M" represents an alkali metal such as lithium, sodium, potassium, or cesium, or an alkaline earth metal such as magnesium, calcium, strontium, or barium, and "d" represents the valence of "M".

In the general formula (2), examples of the perfluoroalkane sulfonic acid include perfluoromethane sulfonate, perfluoroethane sulfonate, perfluoropropane sulfonate, perfluorobutane sulfonate, perfluoromethyl butane sulfonate, perfluorohexane sulfonate, perfluoroheptane sulfonate, and perfluorooctane sulfonate. In particular, potassium salts thereof are preferably used.

In addition, examples thereof include alkyl sulfonate, benzene sulfonate, alkylbenzene sulfonate, diphenyl sulfonate, naphthalene sulfonate, 2,5-dichlorobenzene sulfonate, 2,4,5-trichlorobenzene sulfonate, diphenylsulfone-3-sulfonate, diphenylsulfone-3,3'-disulfonate, naphthalene trisulfonate, fluoro-derivatives thereof, and alkali metal salts or alkaline earth metal salts of organic sulfonic acids such as polystyrene sulfonate.

Subsequently, as the alkali metal salt compounds and/or alkaline earth metal salt compounds of polystyrene sulfonic acid, a sulfonate group-containing aromatic vinyl-based resin represented by a general formula (3) is exemplified:

[Chemical Formula 1]

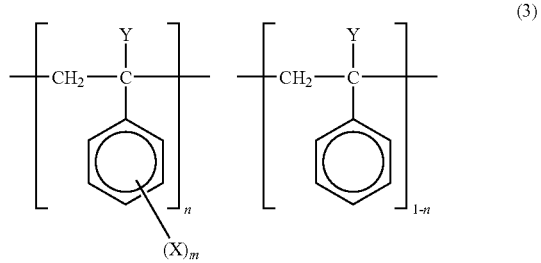

(3)

In the formula, X represents a sulfonate group, "m" represents 1 to 5, Y represents a hydrogen atom or a hydrocarbon group having 1 to 10 carbon atoms, and "n" represents a mole fraction and satisfies the relationship of $0<n\leq 1$.

Herein, the sulfonate group is an alkali metal salt and/or an alkaline earth metal salt of sulfonic acid. In addition, as the metal, sodium, potassium, lithium, rubidium, cesium, berylium, magnesium, calcium, strontium, and barium are exemplified.

It should be noted that Y represents a hydrogen atom or a hydrocarbon group having 1 to 10 carbon atoms, or preferably represents a hydrogen atom or a methyl group. "m" represents 1 to 5, and "n" satisfies the relationship of $0<n\leq 1$. That is, each aromatic ring may be substituted with the sulfonate group (X) at each of all the five positions, may be substituted with the group at each of part of the positions, or may be unsubstituted except for one position.

In order that the PC resin composition of the present invention may obtain an effect of flame retardancy, the ratio at which the aromatic rings are substituted with the sulfonate groups is determined in consideration of, for example, the content of the sulfonate group-containing aromatic vinyl-based resin, and is not particularly limited; the substitution ratio of the resin to be generally used is 10 to 100%.

It should be noted that the sulfonate group-containing aromatic vinyl-based resin in the category of the alkali metal salt and/or alkaline earth metal salt of polystyrene sulfonic acid is not limited to a sulfonate group-containing aromatic vinyl-based resin represented by the general formula (3), and may be a copolymer of a styrene-based monomer and any other copolymerizable monomer.

Herein, a method of producing the sulfonate group-containing aromatic vinyl-based resin is, for example, (a) a method involving polymerizing the aromatic vinyl-based monomers each having a sulfonic group and the like or copolymerizing any such monomer and any other copolymerizable monomer, or (b) a method involving sulfonating an aromatic vinyl-based polymer, a copolymer of an aromatic vinyl-based monomer and any other copolymerizable monomer, or a mixture of those polymers and neutralizing the resultant with an alkali metal and/or an alkaline earth metal.

For example, in the case of the method (b), a sulfonated polystyrene is produced by: adding a mixed liquid of concentrated sulfuric acid and acetic anhydride to a solution of a polystyrene resin in 1,2-dichloroethane; and heating the mixture to cause them to react with each other for several hours. Subsequently, the resultant is neutralized with the same number of moles of potassium hydroxide or sodium hydroxide as that of sulfonate groups, whereby a potassium salt or sodium salt of polystyrene sulfonic acid can be obtained. A weight average molecular weight of the sulfonate group-containing aromatic vinyl-based resin is 1000 to 300,000, preferably about 2000 to 200, 000. It should be noted that the weight average molecular weight can be measured by gel permeation chromatography (GPC) method.

Examples of the organic carboxylic acid include perfluorocarboxylic acid, perfluoromethane carboxylic acid, perfluoroethane carboxylic acid, perfluoropropane carboxylic acid, perfluorobutane carboxylic acid, perfluoromethyl butane carboxylic acid, perfluorohexane carboxylic acid, perfluoroheptane carboxylic acid, and perfluorooctane carboxylic acid. Alkali metal salts or alkaline earth metal salts of those organic carboxylic acids are used. The alkali metal salts and alkaline earth metal salts are the same as the above-mentioned metal salts.

Of the organic alkali metal salts and/or organic alkali earth metal salts, sulfonic acid alkali metal salts, sulfonic acid alkaline earth metal salts, polystyrene sulfonic acid alkali metal salts, and polystyrene sulfonic acid alkaline earth metal salts are preferred.

One kind of the organic alkali metal salt compound and/or organic alkaline earth metal salt compound may be used or two or more kinds of them may be used in combination.

The organic alkali metal salt compound and/or the organic alkaline earth metal salt compound as the component (E) is required to be incorporated into the PC resin composition of the present invention at a content of 0.03 to 1.0 part by mass with respect to 100 parts by mass of the composition formed of the aromatic PC resin as the component (A) and the glass filler as the component (B). When the content of the component (E) is less than 0.03 part by mass, the composition exerts flame retardancy to an insufficient extent. In addition, when the content exceeds 1.0 part by mass, it becomes difficult for the composition to maintain transparency. The content of the component (E) is preferably 0.05 to 0.4 part by mass, or more preferably 0.1 to 0.3 part by mass from the viewpoints of the exertion of the flame retardancy and the retention of the transparency.

In the present invention, the colorant as the component (F) may be added in the case where a colored molded article is desired.

The above colorant as the component (F) is desirably free of opacifying property, and examples of the colorant include a methine-based dye, a pyrazolone-based dye, a perinone-based dye, an azo-based dye, a quinophthalone-based dye, and an anthraquinone-based dye. Of those, from the viewpoint of heat resistance and durability of the composition, anthraquinone-based orange dyes and green dyes are preferably used alone or in a mixture of them.

The colorant is blended in an amount of 0.0001 to 1 part by mass, and preferably 0.1 to 1 part by mass with respect to 100 parts by mass of the composition formed of the aromatic PC resin as the component (A) and the glass filler as the component (B). When the amount is less than 0.0001 part by mass, a desired color tone cannot be obtained. When the amount exceeds 1 part by mass, the opacifying property of the colorant is strengthened, so it becomes difficult to obtain a metallic appearance.

In addition to the components, a release agent, a stabilizer (antioxidant), a colorant, a UV absorbent, an antistatic agent, a fluorescent brightening agent, a silane coupling agent (when the surface of the glass filler is treated by the dry mixing method), and the like can be appropriately incorporated into the PC resin composition of the present invention as required to such an extent that the object of the present invention is not impaired.

A higher fatty acid ester of a monohydric or polyhydric alcohol may be exemplified as the release agent which may be added where required. Such higher fatty acid ester is preferably a partial or complete ester of a monohydric or polyhydric alcohol having 1 to 20 carbon atoms and a saturated fatty acid having 10 to 30 carbon atoms. Examples of the partial or complete ester of a monohydric or polyhydric alcohol and a saturated fatty acid include monoglyceride stearate, monosorbitate stearate, monoglyceride behenate, pentaerythritol monostearate, pentaerythritol tetrastearate, propyleneglycol monostearate, stearyl stearate, palmityl palmitate, butyl stearate, methyl laurate, isopropyl palmitate, and 2-ethylhexyl stearate. Of those, monoglyceride stearate and pentaerythritol tetrastearate are preferably used.

One kind of those release agents may be used alone, or two or more kinds of them may be used in combination. Such release agent is typically added in an amount of about 0.1 to 5.0 parts by mass with respect to 100 parts by mass of the composition formed of the component (A) and the component (B).

As a stabilizer (antioxidant) which may be added where required, phenol-based antioxidants and phosphorous-based antioxidants are exemplified.

Examples of the phenol-based antioxidants include triethylene glycol-bis[3-(3-tert-butyl-5-methyl-4-hydroxyphenyl) propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxybenzylphophonate diethyl ester, tris(3,5-di-tert-butyl-4-hydroxybenzyl)isocyanurate, and 3,9-bis[1,1-dimethyl-2-[β-(3-tert-butyl-4-hydroxy-5-methylphenyl)propionyloxy]ethyl]-2,4,8,10-tetraoxaspiro(5,5)undecane.

Examples of the phosphorous-based antioxidants include triphenyl phosphite, trisnonylphenyl phosphite, tris(2,4-di-tert-butylphenyl)phosphite, tridecyl phosphite, trioctyl phopshite, trioctadecyl phosphite, didecylmonophenyl phosphite, dioctylmonophenyl phosphite, diisopropylmonophenyl phosphite, momobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis (nonylphenyl)pentaerythritol diphosphite, bis(2,4-di-tert-butylphenyl)pentaerythritol diphosphite, and distearyl pentaerythritol diphosphite.

One kind of those antioxidants may be used alone, or two or more kinds of them may be used in combination. Such antioxidant is typically added in an amount of about 0.05 to 1.0 part by mass with respect to 100 parts by mass of the composition formed of the aromatic PC resin as the component (A) and the glass filler as the component (B).

As the UV absorbent, a benzotriazole-based UV absorbent, a triazine-based UV absorbent, a benzoxazine-based UV absorbent, a benzophenone-based UV absorbent, or the like may be used.

Examples of the benzotriazole-based UV absorbent include 2-(2'-hydroxy-5'-methylphenyl)benzotriazole, 2-(2'-hydroxy-3'-(3,4,5,6-tetrahydrophthalimidomethyl)-5'-methylphenyl)benzotriazole, 2-(2'-hydroxy-3',5'-di-tert-butylphenyl)benzotriazole, 2-(2'-hydroxy-5'-tert-octylphenyl) benzotriazole, 2-(3'-tert-butyl-5'-methyl-2'-hydroxyphenyl)-5-chlorobenzotriazole, 2,2'-methylenebis(4-(1,1,3,3-tetramethylbutyl)-6-(2H-benzotriazol-2-yl)phenol), 2-(2'-hydroxy-3'5'-bis(α,α-dimethylbenzyl)phenyl)-2H-benzotriazole, 2-(3',5'-di-tert-amyl-2'-hydroxyphenyl)benzotriazole, and 5-trifluoromethyl-2-(2-hydroxy-3-(4-methoxy-α-cumyl)-5-tert-butylphenyl)-2H-benzotriazole.

Of those, 2-(2'-hydroxy-5'-tert-octylphenyl)benzotriazole is preferred.

As the triazine-based UV absorbent, TINUVIN 400 (trade name) (manufactured by Ciba Specialty Chemicals Inc.) which is a hydroxyphenyltriazine-based UV absorbent is preferred.

Examples of the benzoxazine-based UV absorbent include 2-methyl-3,1-benzoxazin-4-one, 2-butyl-3,1-benzoxazin-4-one, 2-phenyl-3,1-benzoxazin-4-one, 2-(1- or 2-naphthyl)-3,1-benzoxazin-4-one, 2-(4-biphenyl)-3,1-benzoxazin-4-one, 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6- or 1,5-naphthalene)bis(3,1-benzoxazin-4-one), and 1,3,5-tris(3,1-benzoxazin-4-one-2-yl)benzene.

Of those, 2,2'-p-phenylenebis(3,1-benzoxazin-4-one) is preferred.

Examples of the benzophenone-based UV absorbent include 2-hydroxy-4-methoxybenzophenone, 2-hydroxy-4-n-octoxybenzophenone, 2-hydroxy-4-methoxy-2'-carboxybenzophenone, 2,4-dihydroxybenzophenone, and 2,2'-dihydroxy-4-methoxybenzophenone.

Of those, 2-hydroxy-4-n-octoxybenzophenone is preferred.

One kind of those UV absorbents may be used alone, or two or more kinds of them may be used in combination. Such UV absorbent is typically added in an amount of about 0.05 to 2.0 parts by mass with respect to 100 parts by mass of the composition formed of the component (A) and the component (B).

As the antistatic agent, for example, a monoglyceride of the fatty acid of 14 to 30 carbon atoms, and more specifically, monoglyceride stearate, monoglyceride palmitate, or a polyamide polyether block copolymer may be used.

As the fluorescent brightening agent, for example, stilbene-based, benzoimidazole-based, naphthalimide-based, rhodamine-based, coumarin-based, and oxazine-based compounds are exemplified. More specifically, commercially-available products such as UVITEX (trade name, manufactured by Ciba Specialty Chemicals Inc.), OB-1 (trade name, manufactured by Eastman Chemical Company), TBO (trade name, manufactured by SUMITOMO SEIKA CHEMICALS CO., LTD.), Kaycoll (trade name, manufactured by NIPPON SODA CO., LTD.), Kayalight (trade name, manufactured by NIPPON KAYAKU CO., LTD.), and Leucophor EGM (trade name, manufactured by Clariant Japan) may be used.

It should be noted that the compounds exemplified above can be used as a silane coupling agent.

A method of preparing the PC resin composition of the present invention is not particularly limited, and a conventionally known method can be adopted. To be specific, the composition can be prepared by: blending the aromatic PC resin as the component (A), the glass filler as the component (B), the glossy particles as the component (C), the reactive functional group-containing silicone compound as the component (D), the organic alkali metal salt compound and/or the organic alkaline earth metal salt compound as the component (E), and, as required, the various arbitrary components such as the colorant each at a predetermined ratio; and kneading the mixture.

The blending and the kneading are performed by preliminarily mixing the compounds using commonly used devices such as a ribbon blender and a drum tumbler, and using a Henschel mixer, a Banbury mixer, a single-screw extruder, a twin-screw extruder, a multi-screw extruder, and a cokneader. Heating temperature in kneading is appropriately selected generally from a range of about 240 to 300° C.

It should be noted that any component to be incorporated other than the aromatic PC resin can be melted and kneaded with part of the aromatic PC resin in advance before being added: the component can be added as a master batch.

The PC resin composition of the present invention thus prepared contains the glass filler having a refractive index equal or approximate to the refractive index of the aromatic PC resin and the glossy particles, and is excellent in, for example, transparency, mechanical strength, impact resistance, and heat resistance. In addition, the PC resin composition contains the silicone compound having a reactive functional group, and the organic alkali metal salt compound and/or the organic alkali earth metal salt compound. As a result, the PC resin composition provides high flame retardancy. In addition, the PC resin molded article of the present invention obtained by using the PC resin composition is excellent in, for example, transparency, flame retardancy, mechanical strength, impact resistance, and heat resistance as well as metallic appearance or galactic appearance. Further, the PC resin molded article has a flame retardancy, which is determined by evaluation for flame retardancy in conformity with UL94, of 1.5 mmV-0, so the composition has excellent flame retardancy. It should be noted that a flame retardancy evaluation test is described later.

Subsequently, a PC resin molded article of the present invention is described.

The PC resin molded article of the present invention is obtained by molding the above-mentioned PC resin composition of the present invention using an injection molding method or the like. Upon molding, the thickness of the PC molded article is preferably about 0.3 to 10 mm, and is appropriately selected from the range depending on an application of the molded article.

A method of producing the PC resin molded article of the present invention is not particularly limited, and any one of the various conventionally known molding methods such as an injection molding method, an injection compression molding method, an extrusion molding method, a blow molding method, a press molding method, a vacuum molding method, and a foam molding method can be employed; injection molding at a mold temperature of 120° C. or higher, or preferably 120° C. to 140° C. is preferable. In this case, a resin temperature in the injection molding is typically about 240 to 300° C., or preferably 260 to 280° C.

Injection molding at a mold temperature of 120° C. or higher, or preferably 120° C. to 140° C. provides, for example, the following merit: the glass filler sinks, so the molded article can provide a good appearance. The mold temperature is more preferably 125° C. or higher and 140° C. or lower, or still more preferably 130° C. to 140° C. The PC resin composition of the present invention as a molding raw material is preferably pelletized by the melt-kneading method before being used. It should be noted that gas injection molding for the prevention of sink marks in the appearance of the molded article or for a reduction in weight of the molded article can be adopted as an injection molding method.

In the thus-obtained PC resin molded article of the present invention, even when a weld line is formed, the difference in lightness between the left and right sides of the weld line is not visually observed, and a good metallic appearance or a galactic appearance can be obtained on the entire surface of the molded article.

It should be noted that a method of measuring the difference in lightness between the left and right sides of the weld line is described later.

In addition, with regard to the optical properties of the PC resin molded article of the present invention thus-obtained, a total light transmittance for visible light is 40% or more, or preferably 42% or more. It should be noted that methods of measuring the optical properties are described later.

In addition, the present invention provides a method of producing a PC resin molded article characterized by including subjecting the above-mentioned PC resin composition of the present invention to an injection molding at a mold temperature of 120° C. or higher, or preferably 120 to 140° C. to produce a molded article having a thickness of preferably 0.3 to 10 mm.

The PC resin composition of the present invention contains the glass filler having a refractive index equal or approximate to that of the aromatic PC resin and the glossy particles, is excellent in, for example, transparency, mechanical strength, impact resistance, and heat resistance, and is provided with high flame retardancy because it contains a silicone compound having a reactive functional group, and an organic alkali metal salt compound and/or the organic alkaline earth metal salt compound. In addition to having a metallic appearance or galactic appearance, the PC resin molded article of the present invention obtained by using the composition is excellent in, for example, flame retardancy, mechanical strength, impact resistance, and heat resistance.

The PC resin molded article of the present invention is preferably used for the following items, for example:

(1) various parts of televisions, radio cassettes, video cameras, videotape recorders, audio players, DVD players, air conditioners, cellular phones, displays, computers, resistors, electric calculators, copiers, printers, and facsimiles, and electrical/electronic device parts such as outside plates and housing materials;

(2) parts for precision machinery such as cases and covers for precision machines such as PDA's, cameras, slide projectors, clocks, gauges, display instruments;

(3) parts for automobiles such as automobile interior materials, exterior products, and automobile body parts including instrument panels, upper garnishes, radiator grills, speaker grills, wheel covers, sunroofs, head lamp reflectors, door visors, spoilers, rear windows, and side windows; and (4) parts for furniture such as chairs, tables, desks, blinds, lighting covers, and interior instruments.

EXAMPLES

Hereinafter, the present invention is described in more detail by way of examples and comparative examples, but the present invention is not limited thereto.

It should be noted that a test piece was molded out of a PC resin composition pellet obtained in each of the following examples and comparative examples as described below, and was evaluated for various characteristics.

(1) Mechanical Properties

A pellet was subjected to an injection molding with a 100 ton injection molding machine (manufactured by TOSHIBA MACHINE CO., LTD., device name "IS100E") at a mold temperature of 130° C. and a resin temperature of 280° C., whereby respective test pieces each having a predetermined form were produced. The tensile properties (fracture strength and elongation) of each test piece were measured in conformity with ASTM D638, and the flexural properties (strength and elastic modulus) of the test piece were measured in conformity with ASTM 790.

In addition, the Izod impact strength of the test piece was measured in conformity with ASTM D256.

(2) Physical Properties (Heat Distortion Temperature Under Load and Specific Gravity)

A PC resin composition pellet was subjected to an injection molding with a 100 ton injection molding machine (manufactured by TOSHIBA MACHINE CO., LTD., device name "IS100E") at a mold temperature of 130° C. and a resin temperature of 280° C., whereby respective test pieces each having a predetermined form were produced.

The heat distortion temperature under load of each test piece was measured in conformity with ASTM D648, and the obtained temperature was used as the index of heat resistance. The specific gravity of the test piece was measured in conformity with ASTM D792.

(3) Optical Properties (Presence or Absence of Orientation in Glossy Particle, and Total Light Transmittance)

A PC resin composition pellet was subjected to an injection molding with a mold having two-point-gate by using a 100 ton injection molding machine (manufactured by Sumitomo Heavy Industries, Ltd., device name "SG100M-HP") at a mold temperature of 130° C., whereby a test piece having a weld line and measuring 80×80×2 mm was produced. The thus-obtained test piece was irradiated with daylight in an oblique direction of 45° and was determined whether the difference in lightness of the glossy particles between the left and right sides of the weld line could be visually observed.

The total light transmittance of the test piece in a visible light region of 380 to 780 nm was measured with a spectrophotometer (manufactured by Hitachi, Ltd., device name "U-4100") inconformity with JIS K 7105.

(4) Appearance

The appearance of a surface in the test piece used for the measurement of the optical properties was visually observed, and was distinguished by determining whether the test piece has a galactic appearance, or metallic appearance, which is an object of the present invention, or not (marble-like appearance).

(5) Flame Retardancy

A PC resin composition pellet was subjected to an injection molding by using a 45-ton injection molding machine (manufactured by TOSHIBA MACHINE CO., LTD., device name "IS45PV") at a mold temperature of 130° C. and a resin temperature of 280° C., whereby a test piece measuring 127× 12.7×1.5 mm was produced. The flame retardancy of the test piece was measured in conformity with Underwriters Laboratories Subject 94 (UL94).

The kinds of the respective components used in the production of each PC resin composition pellet are shown below.

(1) PC1 [Component (A)]: bisphenol A polycarbonate having a viscosity-average molecular weight of 19,000 (manufactured by Idemitsu Kosan Co., Ltd., trade name "TARFLON FN1900A", and a refractive index of 1.585)

(2) Refractive index-improved GF1 [Component (B)]: glass fibers each formed of a chopped strand having a diameter of 13 μm×3 mm [manufactured by ASAHI FIBER GLASS Co., Ltd., glass composition (% by mass): $SiO_2$ (52.6), $Al_2O_3$ (13.3), CaO (21.8), $TiO_2$ (5.9), $B_2O_3$ (5.9), MgO (0.5), a refractive index of 1.585, and a specific gravity of 2.70]

(3) Refractive index-improved GF2 [Component (B)]; glass fibers each formed of a chopped strand having a diameter of 13 μm×3 mm [manufactured by ASAHI FIBER GLASS Co., Ltd., glass composition (% by mass): $SiO_2$ (57.5), $Al_2O_3$ (12.0), CaO (21.0), $TiO_2$ (5.0), MgO (2.5), ZnO (1.5), $Na_2O+K_2O+Li_2O$ (0.5), a refractive index of 1.584, and a specific gravity of 2.69]

(4) GF1 [for comparison with component (B)]: glass fibers each formed of chopped strand (φ 13 μm×3 mm) made of E glass [manufactured by ASAHI FIBER GLASS Co., Ltd., trade name "03MA409C", glass composition (% by mass): $SiO_2$ (55.4), $Al_2O_3$ (14.1), CaO (23.2), $B_2O_3$ (6.0), MgO (0.4), $Na_2O+K_2O+Li_2O$ (0.7), $Fe_2O_3$ (0.2), $F_2$ (0.6), a refractive index of 1.555, and a specific gravity of 2.54]

(5) GF2 [for comparison with component (B)]: glass fibers each formed of chopped strand having a diameter of 13 μm×3 mm made of ECR glass [manufactured by ASAHI FIBER GLASS Co., Ltd., glass composition (% by mass): $SiO_2$ (58.0), $Al_2O_3$ (11.4), CaO (22.0), $TiO_2$ (2.2), MgO (2.7), ZnO (2.7), $Na_2O+K_2O+Li_2O$ (0.8), $Fe_2O_3$ (0.2), a refractive index of 1.579, and a specific gravity of 2.72]

(6) Glossy particles 1 [Component (C-1)]: glass flakes having an average particle diameter of 30 μm coated with titanium oxide [manufactured by NIPPON SHEET GLASS Co., Ltd., trade name "MC1030RS"]

(7) Glossy particles 2 [Component (C-2)]: glass flakes having an average particle diameter of 90 μm coated with titanium oxide [manufactured by NIPPON SHEET GLASS Co., Ltd., trade name "MC5090RS"]

(8) Glossy particles 3 [Component (C-1)]: aluminum foil having an average particle diameter of 40 μm coated with a coloring material [manufactured by Nihonboshitsu Co., Ltd., trade name "ASTROFLAKE #0"]

The average particle diameter of each of Glossy Particles 1 to 3 was determined from the result of a particle size distribution measured for a kerosene-based solution containing the glossy particles at a concentration of 0.1% by mass with a laser diffraction particle size distribution-measuring apparatus [manufactured by Malvern Instruments Ltd., MASTER SIZER 2000].

(9) Flame retardant assistant 1 [Component (D)]: a reactive silicone compound having a refractive index of 1.51 and containing a vinyl group and a methoxy group as functional groups [manufactured by Shin-Etsu Chemical Co., Ltd., trade name "KR-219"]

(10) Flame retardant assistant 2 [Component (D)]: a reactive silicone compound having a refractive index of 1.49 and containing a vinyl group and a methoxy group as functional groups [manufactured by Dow Corning Toray Co., Ltd., trade name "DC3037"]

(11) Flame retardant assistant 3 [for comparison with component (D)]: a polytetrafluoroethylene resin [manufactured by Asahi-ICI Fluoropolymers Co., Ltd., trade name "CD076"]

(12) Flame Retardant 1 [Component (E)]: potassium perfluorobutane sulfonate [manufactured by Dainippon Ink and Chemicals, Incorporated., trade name "Megafac F114"]

(13) Flame Retardant 2 [Component (E)]: an aqueous solution containing sodium polystyrene sulfonate having a weight-average molecular weight of 20,000 and a sulfonation ratio of 100% at a concentration of 30% by mass [manufactured by Lion Corporation, trade name "Leostad FRPSS-NA30"]

(14) Release agent 1: pentaerythritol tetrastearate [manufactured by RIKEN VITAMIN CO., LTD., trade name "EW440A"]

(15) Stabilizer 1: an antioxidant [octadecyl-3-(3,5-di-tert-butyl-4-hydroxyphenyl)propionate, manufactured by Ciba Specialty Chemicals Inc., trade name "Irganox 1076"]
(16) Stabilizer 2: an antioxidant [tris(2,4-di-tert-butylphenyl) phosphite, manufactured by Ciba Specialty Chemicals Inc., trade name "Irgafos 168"]
(17) Colorant 1: anthraquinone-based orange dye [manufactured by Mitsubishi Chemical Corporation., trade name "Dia Resin Orange HS"]
(18) Colorant 2: anthraquinone-based green dye [manufactured by Sumitomo Chemical Co., Ltd., trade name "Sumiplast green G"]

Examples 1 to 5 and Comparative Examples 1 to 10

In each of the examples and the Comparative examples, the respective components were mixed at a blending ratio shown in Table 1, and the mixture was melted and kneaded with a twin-screw extruder [manufactured by TOSHIBA MACHINE CO., LTD., device name "TEM-35B")] at 280° C., whereby a PC resin composition pellet was produced. A test piece was molded out of each pellet as described above, and its mechanical properties, physical properties, optical properties, and flame retardancy were determined. Table 1 shows the results.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Composition | PC1 [Component (A)] | 80 | 80 | 90 | 90 | 60 | 80 | 80 | 80 |
| | Refractive index-improved GF1 [Component (B)] | 20 | | 10 | 10 | 40 | | 20 | 20 |
| | Refractive index-improved GF2 [Component (B)] | | 20 | | | | 20 | | |
| | GF1 (Comparison) [for comparison with component (B)] | | | | | | | | |
| | GF2 (Comparison) [for comparison with component (B)] | | | | | | | | |
| | Glossy Particles 1 [Component (C-1)] | | 0.2 | 1 | 0.3 | 1 | 5 | | 1 |
| | Glossy Particles 2 [Component (C-2)] | 0.5 | 0.1 | 0.5 | 0.2 | 0.5 | | 3 | 0.5 |
| | Glossy Particles 3 [Component (C-1)] | 0.8 | | | | | | | |
| | Flame Retardant Assistant 1 [Component (D)] | 0.3 | | 0.3 | 0.3 | | 0.3 | 0.3 | |
| | Flame Retardant Assistant 2 [Component (D)] | | 0.3 | | | 0.3 | | | |
| | Flame Retardant Assistant 3 [for comparison with component (D)] | | | | | | | | 0.3 |
| | Flame Retardant 1 [Component (E)] | 0.1 | | 0.1 | 0.1 | 0.1 | 0.1 | 0.1 | 0.1 |
| | Flame Retardant 2 [Component (E)] | | 0.1 | | | | | | |
| | Release agent 1 | 0.8 | 0.8 | 0.8 | 0.8 | 0.8 | 0.8 | 0.8 | 0.8 |
| | Stabilizer 1 | 0.1 | 0.1 | 0.1 | 0.1 | 0.1 | 0.1 | 0.1 | 0.1 |
| | Stabilizer 2 | 0.1 | 0.1 | 0.1 | 0.1 | 0.1 | 0.1 | 0.1 | 0.1 |
| | Colorant 1 | 0.1 | 0.1 | 0.1 | 0.1 | 0.1 | 0.1 | 0.1 | 0.1 |
| | Colorant 2 | 0.3 | 0.3 | 0.3 | 0.3 | 0.3 | 0.3 | 0.3 | 0.3 |
| Mechanical properties | Tensile fracture strength (Mpa) | 100 | 100 | 80 | 80 | 130 | 100 | 100 | 100 |
| | Tensile elongation (%) | 4 | 4 | 5 | 5 | 2 | 4 | 4 | 4 |
| | Flexural strength (Mpa) | 140 | 140 | 120 | 120 | 180 | 140 | 140 | 140 |
| | Flexural modulus (Mpa) | 5900 | 5900 | 3900 | 3900 | 8900 | 5900 | 5900 | 5900 |
| | Notched Izod impact strength (kJ/cm$^2$) | 15 | 15 | 10 | 10 | 15 | 14 | 14 | 14 |
| Physical properties | Heat distortion temperature under load (° C.) | 143 | 143 | 141 | 141 | 144 | 144 | 144 | 141 |
| | Specific gravity | 1.33 | 1.33 | 1.27 | 1.27 | 1.52 | 1.33 | 1.33 | 1.33 |
| Optical properties | Glossy particle orientation (difference in lightness between left and right sides of weld) | Not visually observable | Not visually observable | Not visually observable | Not visually observable | Not visually observable | visually observable | visually observable | Not visually observable |
| | Total light transmittance | 43 | 44 | 43 | 44 | 43 | 43 | 43 | 32 |
| Appearance | | Metallic | Galactic | Metallic | Galactic | Metallic | Metallic | Metallic | Marble |
| Flame retardancy | UL-94 (Test piece thickness: 1.5 mm) | V-0 | V-0 | V-0 | V-0 | V-0 | V-1 | V-0 | V-0 |

TABLE 1-continued

|  |  | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| Composition | PC1 [Component (A)] | 80 | 80 | 99 | 90 | 90 | 80 | 80 |
|  | Refractive index-improved GF1 [Component (B)] |  |  | 1 | 10 | 10 |  |  |
|  | Refractive index-improved GF2 [Component (B)] |  |  |  |  |  | 20 | 20 |
|  | GF1 (Comparison) [for comparison with component (B)] | 20 |  |  |  |  |  |  |
|  | GF2 (Comparison) [for comparison with component (B)] |  | 20 |  |  |  |  |  |
|  | Glossy Particles 1 [Component (C-1)] | 1 | 1 | 1 | 3 |  | 0.3 |  |
|  | Glossy Particles 2 [Component (C-2)] | 0.5 | 0.5 | 1 |  | 2 |  | 0.3 |
|  | Glossy Particles 3 [Component (C-1)] |  |  |  |  |  |  |  |
|  | Flame Retardant Assistant 1 [Component (D)] | 0.3 | 0.3 | 0.6 | 0.3 | 0.3 |  |  |
|  | Flame Retardant Assistant 2 [Component (D)] |  |  |  |  |  | 0.3 | 0.3 |
|  | Flame Retardant Assistant 3 [for comparison with component (D)] |  |  |  |  |  |  |  |
|  | Flame Retardant 1 [Component (E)] | 0.1 | 0.1 | 0.15 | 0.1 | 0.1 |  |  |
|  | Flame Retardant 2 [Component (E)] |  |  |  |  |  | 0.1 | 0.1 |
|  | Release agent 1 | 0.8 | 0.8 | 0.8 | 0.8 | 0.8 | 0.8 | 0.8 |
|  | Stabilizer 1 | 0.1 | 0.1 | 0.1 | 0.1 | 0.1 | 0.1 | 0.1 |
|  | Stabilizer 2 | 0.1 | 0.1 | 0.1 | 0.1 | 0.1 | 0.1 | 0.1 |
|  | Colorant 1 | 0.1 | 0.1 | 0.1 | 0.1 | 0.1 | 0.1 | 0.1 |
|  | Colorant 2 | 0.3 | 0.3 | 0.3 | 0.3 | 0.3 | 0.3 | 0.3 |
| Mechanical properties | Tensile fracture strength (Mpa) | 100 | 100 | 60 | 80 | 80 | 100 | 100 |
|  | Tensile elongation (%) | 4 | 4 | 8 | 5 | 5 | 4 | 4 |
|  | Flexural strength (Mpa) | 140 | 140 | 60 | 120 | 120 | 140 | 140 |
|  | Flexural modulus (Mpa) | 5900 | 5900 | 2500 | 3900 | 3900 | 5900 | 5900 |
|  | Notched Izod impact strength (kJ/cm$^2$) | 14 | 14 | 10 | 10 | 10 | 15 | 15 |
| Physical properties | Heat distortion temperature under load (° C.) | 141 | 141 | 128 | 141 | 141 | 143 | 143 |
|  | Specific gravity | 1.33 | 1.33 | 1.20 | 1.27 | 1.27 | 1.33 | 1.33 |
| Optical properties | Glossy particle orientation (difference in lightness between left and right sides of weld) | Not visually observable | Not visually observable | visually observable | visually observable | visually observable | Not visually observable | Not visually observable |
|  | Total light transmittance | 7 | 7 | 44 | 44 | 44 | 45 | 45 |
| Appearance |  | Marble | Marble | Galactic | Metallic | Metallic | Note 1) | Note 1) |
| Flame retardancy | UL-94 (Test piece thickness: 1.5 mm) | V-0 | V-0 | V-0 | V-0 | V-0 | V-0 | V-0 |

(Note 1)
The appearance can be recognized as being galactic (glossy particles are not visually observable).

From Table 1, the following are found.

As is apparent from the respective Examples, there can be obtained a PC resin molded article, in which the difference in lightness between the left and right sides of the weld line is not visually observed and a good metallic or galactic appearance is provided, by molding the PC resin composition obtained by blending a predetermined amount of the aromatic PC resin, a predetermined amount of the glass filler having a difference in refractive index of 0.002 or less from the PC resin, predetermined amounts of the two kinds of glossy particles, a predetermined amount of the silicone compound having a reactive functional group, and predetermined amounts of the organic alkali metal salt compound and/or the organic alkaline earth metal salt compound.

The molded article can be further provided with excellent flame retardancy, while maintaining mechanical properties, heat resistance, and total light transmittance.

Further, Table 1 shows the following.

As is apparent from Comparative Example 1, in the case where the component (C-1) having an average particle diameter of 30 μm is used alone as glossy particles in an amount of 5 parts by mass exceeding 3.0 parts by mass, the difference in lightness between the left and right sides of the weld is visually observable, and the flame retardancy is poor even when the other conditions are identical to those of the Examples.

As is apparent from Comparative Example 2, in the case where the component (C-2) having an average particle diameter of 90 μm is used alone as glossy particles, the difference in lightness between the left and right sides of the weld is visually observable even when the other conditions are identical to those of the Examples.

As is apparent from Comparative Example 3, in the case where Flame retardant assistant 3 for comparison is used without the use of Flame retardant assistant 1 or 2, that is, the component (D) (the silicone compound having a reactive functional group), the appearance becomes marble and hence the targeted galactic or metallic one cannot be obtained, and the total light transmittance is low even when the other conditions are identical to those of the Examples.

As is apparent from Comparative Examples 4 and 5, in the case where the glass filler having a difference in refractive index from the PC resin of more than 0.002 is used, the appearance becomes marble and hence the targeted galactic or metallic one cannot be obtained, and the total light transmittance is low even when the other conditions are identical to those of the Examples.

As is apparent from Comparative Example 6, in the case where the addition amount of the glass filler having a difference in refractive index of 0.002 or less from the PC resin is small, the mechanical properties and the physical properties reduce, and the difference in lightness between the left and right sides of the weld is visually observable even when the other conditions are identical to those of the Examples.

As is apparent from Comparative Examples 7 and 8, in the case where the component (C-1) having an average particle diameter of 30 μm or the component (C-2) having an average particle diameter of 90 μm is used alone as glossy particles, the difference in lightness between the left and right sides of the weld is visually observable even when the other conditions are identical to those of the Examples.

It is apparent that, in the case where the component (C-1) having an average particle diameter of 30 μm or the component (C-2) having an average particle diameter of 90 μm is used alone as glossy particles as in each of Comparative Examples 9 and 10, an appearance that can be recognized as being galactic or metallic cannot be obtained even when the other conditions are identical to those of the Examples.

INDUSTRIAL APPLICABILITY

The PC resin composition of the present invention contains a glass filler having a refractive index equal or approximate to that of its aromatic PC resin, glossy particles, a reactive silicone compound, and an organic alkali metal salt compound and/or an organic alkaline earth metal salt compound. A molded article having the following characteristics can be obtained by molding the PC resin composition as a raw material: even when a weld line is produced in the molded product, no difference in lightness is visually observed between the left and right sides of the weld line. Further, such resin composition is provided with high flame retardancy, and the PC resin molded article of the present invention obtained by using the PC resin composition can suitably find applications in a wide variety of fields.

The invention claimed is:

1. A polycarbonate resin composition, comprising:
   a composition comprising 60 to 90 parts by mass of an aromatic polycarbonate resin (A) and 40 to 10 parts by mass of a glass filler (B) having a difference in refractive index of 0.002 or less from the aromatic polycarbonate resin;
   0.005 to 3.0 parts by mass of glossy particles (C-1) having an average particle diameter of 10 μm or more and less than 50 μm with respect to 100 parts by mass of the composition;
   0.005 to 2.0 parts by mass of glossy particles (C-2) having an average particle diameter of 50 to 300 μm with respect to 100 parts by mass of the composition;
   0.01 to 3.0 parts by mass of a silicone compound (D) comprising a reactive functional group with respect to 100 parts by mass of the composition; and
   0.03 to 1.0 part by mass of at least one selected from the group consisting of an organic alkali metal salt compound and an organic alkali earth metal salt compound (E) with respect to 100 parts by mass of the composition,
   wherein the glossy particles (C-1) and (C-2) each comprise at least one selected from the group consisting of mica, metal particles, metal sulfide particles, particles each comprising a surface coated with a metal or a metal oxide, and glass flakes each comprising a surface coated with a metal or a metal oxide.

2. The polycarbonate resin composition of claim 1, wherein the glass filler (B) comprises a glass fiber.

3. The polycarbonate resin composition of claim 1, wherein the glass filler (B) has a refractive index from 1.583 to 1.587.

4. The polycarbonate resin composition of claim 1, further comprising 0.0001 to 1 part by mass of a colorant (F) with respect to 100 parts by mass of the composition comprising the aromatic polycarbonate resin (A) and the glass filler (B).

5. A polycarbonate resin molded article obtained by molding the polycarbonate resin composition of claim 1.

6. The article of claim 5, wherein the article is obtained by injection molding at a mold temperature of 120° C. or higher.

7. The article of claim 5, wherein the article has a flame retardancy, which is determined by a flame retardancy evaluation method in conformity with UL94, of 1.5 mmV-0.

8. A method of producing a polycarbonate resin molded article, the method comprising;
   injection molding the polycarbonate resin composition of claim 1 at a mold temperature of 120° C. or higher.

9. The polycarbonate resin composition of claim 1, wherein at least one selected from the group consisting of glossy particles (C-1) and (C-2) comprises mica.

10. The polycarbonate resin composition of claim 1, wherein at least one selected from the group consisting of glossy particles (C-1) and (C-2) comprises metal particles.

11. The polycarbonate resin composition of claim 1, wherein at least one selected from the group consisting of glossy particles (C-1) and (C-2) comprises metal sulfide particles.

12. The polycarbonate resin composition of claim 1, wherein at least one selected from the group consisting of glossy particles (C-1) and (C-2) comprises particles each comprising a surface coated with a metal or a metal oxide.

13. The polycarbonate resin composition of claim 1, wherein at least one selected from the group consisting of glossy particles (C-1) and (C-2) comprises glass flakes each comprising a surface coated with a metal or a metal oxide.

* * * * *